No. 659,594. Patented Oct. 9, 1900.
J. P. RIEDY.
GRASS CUTTER.
(Application filed July 9, 1900.)
(No Model.)

Witnesses:—
Frank H. Graham
Lewis H. Whitehead

Inventor:—
John P. Riedy
by his Attorneys
Howson & Howson

UNITED STATES PATENT OFFICE.

JOHN P. RIEDY, OF WILLIAMSPORT, PENNSYLVANIA, ASSIGNOR OF ONE-HALF TO JAMES W. BOWMAN, OF SAME PLACE.

GRASS-CUTTER.

SPECIFICATION forming part of Letters Patent No. 659,594, dated October 9, 1900.

Application filed July 9, 1900. Serial No. 22,984. (No model.)

*To all whom it may concern:*

Be it known that I, JOHN P. RIEDY, a citizen of the United States, and a resident of Williamsport, Pennsylvania, have invented certain Improvements in Grass-Cutters, of which the following is a specification.

My invention relates to that class of grass cutters or clippers which consist of a stationary plate with projecting fingers or teeth, in combination with pivoted teeth alternating with the fixed teeth, so that the grass will be cut by the joint action of the sharpened edges of the fixed and swinging teeth.

My invention consists of an implement of this character intended to be readily manipulated by hand and comprises certain features of construction and combinations of parts fully set forth and specifically claimed hereinafter.

Figure 1:
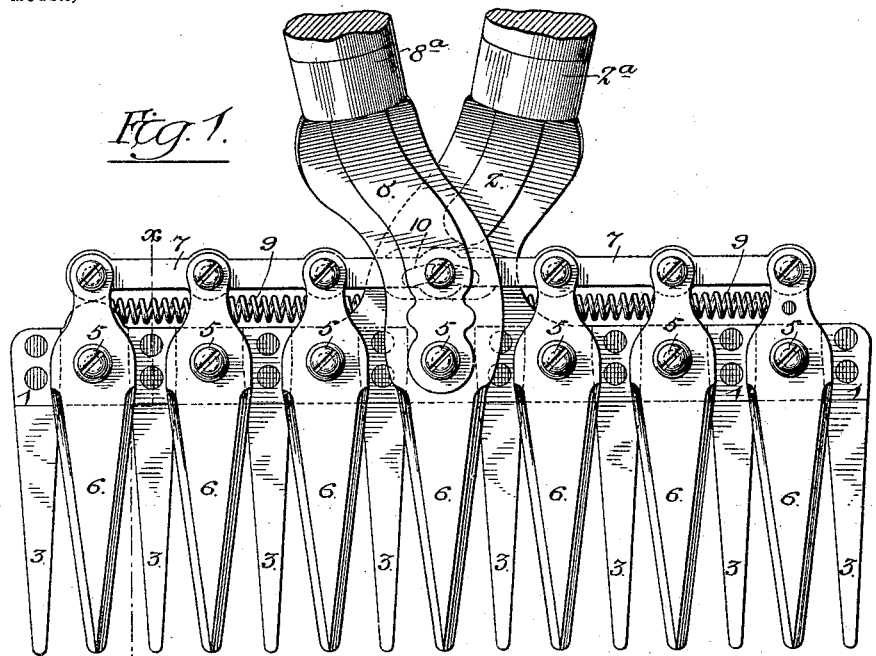
Figure 2:
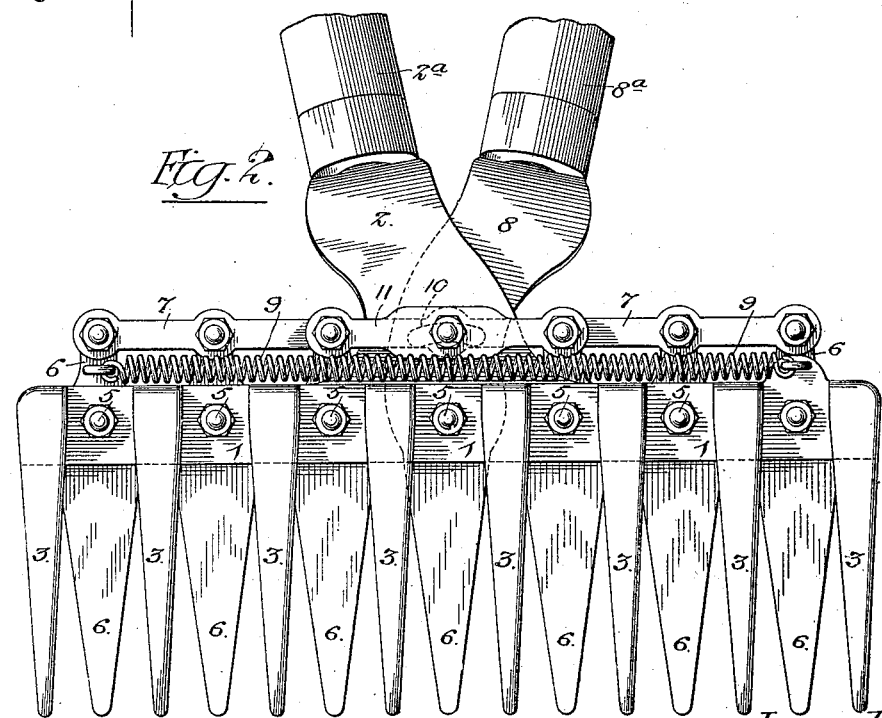

In the accompanying drawings, Figure 1 is a top view of a grass-cutter constructed in accordance with my invention, the swinging teeth being shown in the mid-position. Fig. 2 is a bottom view of the cutter; and Fig. 3 is a transverse section on the line $xx$, Fig. 1.

Figure 3:

1 represents the fixed plate of the cutter, provided with a rearwardly-projecting stem or shank 2, which is furnished with a suitable handle $2^a$, this plate having forwardly-projecting teeth 3, which, as shown in Fig. 3, are each composed of deep bars suitably secured at their rear ends to the plate 1 and having inclined or curved under faces, so that the depth of the tooth gradually diminishes from its inner end outwardly to the point of the tooth, whereby the implement can be readily pushed over the ground and the upper or cutting face of the tooth will always be preserved at the proper elevation. Each of the teeth is preferably provided with openings 4, so as to lighten the same, and each tooth may be composed of a casting of malleable iron or steel or may be punched from a plate of iron or steel, as desired.

Hung to the stationary plate 1 by means of pivot-bolts 5 are a series of levers 6, the projecting forward arms of these levers having sharpened edges, so as to serve as swinging cutting-teeth and coöperate with the sharpened edges of the fixed teeth 3, in order to cut the grass as they swing to and fro between said fixed teeth.

The rear arms of the levers 6 are connected together by a bar 7, and the central lever of the series is extended rearwardly, so as to form a stem or shank 8, which carries a handle $8^a$ similar to the handle $2^a$ of the fixed plate 1 of the cutter. Hence by proper manipulation of these handles the desired to-and-fro swinging movement can be simultaneously imparted to the entire series of cutting-teeth 6.

As manual power can be exerted most effectively in moving the handles $2^a$ and $8^a$ toward each other, it is preferable in some cases to cause separation of the handles by means of a spring, and this can be readily effected, as shown, for instance, in Fig. 2, by disposing a coiled spring 9 in the rear of the fixed teeth 3 of the cutter, one end of said spring 9 being connected to a suitable projection on the fixed plate 1 and the other end being connected to a projection on the rearwardly-extending arm of one of the levers 6. Being behind the deep rear ends of the fixed cutting-teeth, the spring 9 does not rest upon the ground nor is it likely to become choked or clogged with grass, weeds, or dirt or interfere with the free movement of the cutter over the surface of the ground.

The bolt which connects the central lever 6 to the longitudinal bar 7 passes through a longitudinal slot 10 in the stem or shank 2 of the fixed plate 1, and in order to prevent the clogging of this slot with grass or dirt said slot is covered by a plate 11, which moves with the bar 7 and is connected to bolts on opposite sides of the central bolt.

An implement of the character described can be readily operated by hand and provides a means of cutting with extreme rapidity grass which cannot be reached by an ordinary mower—as, for instance, that located close to walls or fences or at the edges of walks or flower-beds or in proxmity to shrubbery.

Having thus described my invention, I claim and desire to secure by Letters Patent—

1. The combination in a grass cutter or clipper, of the fixed plate having projecting teeth each of deep vertical cross-section, a series of cutting-levers pivoted to said plate, a bar connecting said levers, handles projecting rearwardly from the fixed plate and from one of said levers, and a coiled spring disposed in the rear of the fixed teeth and connected at one end to the fixed plate and at the other end to one of the pivoted levers, substantially as specified.

2. The combination in a grass cutter or clipper, of a fixed plate having projecting cutting-teeth and a rearwardly-projecting slotted stem or shank with handle thereon, a series of cutting-levers pivoted to said fixed plate, a bar connecting said levers, a handle projecting rearwardly from one of said levers, a bolt passing through the slot in the stem or shank of the fixed plate, and a plate covering said slot and secured to and moving with the connecting-bar of the series of levers, substantially as specified.

In testimony whereof I have signed my name to this specification in the presence of two subscribing witnesses.

JOHN P. RIEDY.

Witnesses:
J. CLINTON HILL,
R. BERNDT.